United States Patent [19]
Furuichi

[11] Patent Number: 4,631,458
[45] Date of Patent: Dec. 23, 1986

[54] CURRENT CONTROL TYPE CIRCUIT FOR BRUSHLESS MOTOR

[75] Inventor: Tokinori Furuichi, Yokohama, Japan

[73] Assignee: Hitachi, Ltd., Tokyo, Japan

[21] Appl. No.: 791,344

[22] Filed: Oct. 25, 1985

[30] Foreign Application Priority Data

Oct. 26, 1984 [JP] Japan ................... 59-223953

[51] Int. Cl.$^4$ .............................. H02P 6/02
[52] U.S. Cl. .................... 318/254; 318/138; 318/307; 318/309
[58] Field of Search ............ 318/138, 254 A, 254, 318/439, 307, 309, 330, 346, 599, 811

[56] References Cited

U.S. PATENT DOCUMENTS

| 4,039,911 | 8/1977 | Tanikoshi | 318/254 A |
| 4,114,073 | 9/1978 | Uzuka | 318/254 A |

FOREIGN PATENT DOCUMENTS

| 2516804 | 10/1976 | Fed. Rep. of Germany | 318/254 |
| 58-159687 | 9/1983 | Japan | 318/254 |
| 59-149782 | 8/1984 | Japan | 318/309 |
| 0664265 | 5/1979 | U.S.S.R. | 318/254 |

Primary Examiner—William M. Shoop, Jr.
Assistant Examiner—Bentsu Ro
Attorney, Agent, or Firm—Antonelli, Terry & Wands

[57] ABSTRACT

There is provided a chopping, current-control type driver circuit for brushless motor including a circuit for effecting chopping on the basis of a speed/phase error signal, a changeover circuit for changing over the current direction of Hall devices depending upon whether said error signal is positive or negative, switch circuit for supplying power to stator coils on the basis of the Hall device output, a current detection device, and an amplifier serving as an inverting amplifier or a noninverting amplifier depending upon whether the error signal is positive or negative, wherein a negative feedback signal is applied to the error signal in the form of the current value detected by the current detection device in order to control the current flowing through the motor stator.

3 Claims, 2 Drawing Figures

CURRENT CONTROL TYPE CIRCUIT FOR BRUSHLESS MOTOR

BACKGROUND OF THE INVENTION

The present invention relates to a driver circuit for brushless DC motor and in particlular to a current control type driver circuit suitable to a chopping type driver circuit for controlling the rotation of a motor with an accelerating torque at lagging of the motor speed and a decelerating torque at leading of the motor speed.

In a chopping type driver circuit for brushless motor such as disclosed in, for example, Japanese Patent Unexamined Publication No. 57-145586, the speed error signal is detected and the current flowing through the winding of the motor is switched by switching elements on the basis of the detected speed error signal.

Denoting the input voltage of the motor as E, the speed electromotive force which depends on the rotation of the motor as Ea, the resistance of the stator winding as Ra, the current flowing into the stator as Ia, and proportionality constant as K, the acceleration control torque $T_F$ and the deceleration control torque $T_B$ during the motor rotation can be represented as, $$T_F = kIa = k(E-Ea)/Ra$$

$$T_B = kI'a = k(-E-Ea)/Ra = K'(E+Ea)/Ra$$

where $K' = -K$.

That is to say, the acceleration control torque during the rotation is different from the deceleration control torque during the rotation because of the influence of the speed electromotive force. On the basis of the speed error signal, therefore, the number of rotations during rotation is controlled with different torques. This results in a drawback that the number of rotations cannot be controlled smoothly.

SUMMARY OF THE INVENTION

An object of the present invention is to provide a current control type chopping driver circuit which is free from the above described drawback of the prior art and which makes the acceleration control torque during the motor rotation equal to the deceleration control torque.

In accordance with the present invention, the current flowing through the motor winding is detected to apply negative feedback based upon the motor winding current to means for amplifying the speed error signal, whereby equal magnitude of currents are made to flow through the motor winding in the acceleration control and in the deceleration control to make the control torque in the acceleration direction equal to that in the deceleration direction.

DESCRIPTION OF THE PREFERRED EMBODIMENT

Figure 1:
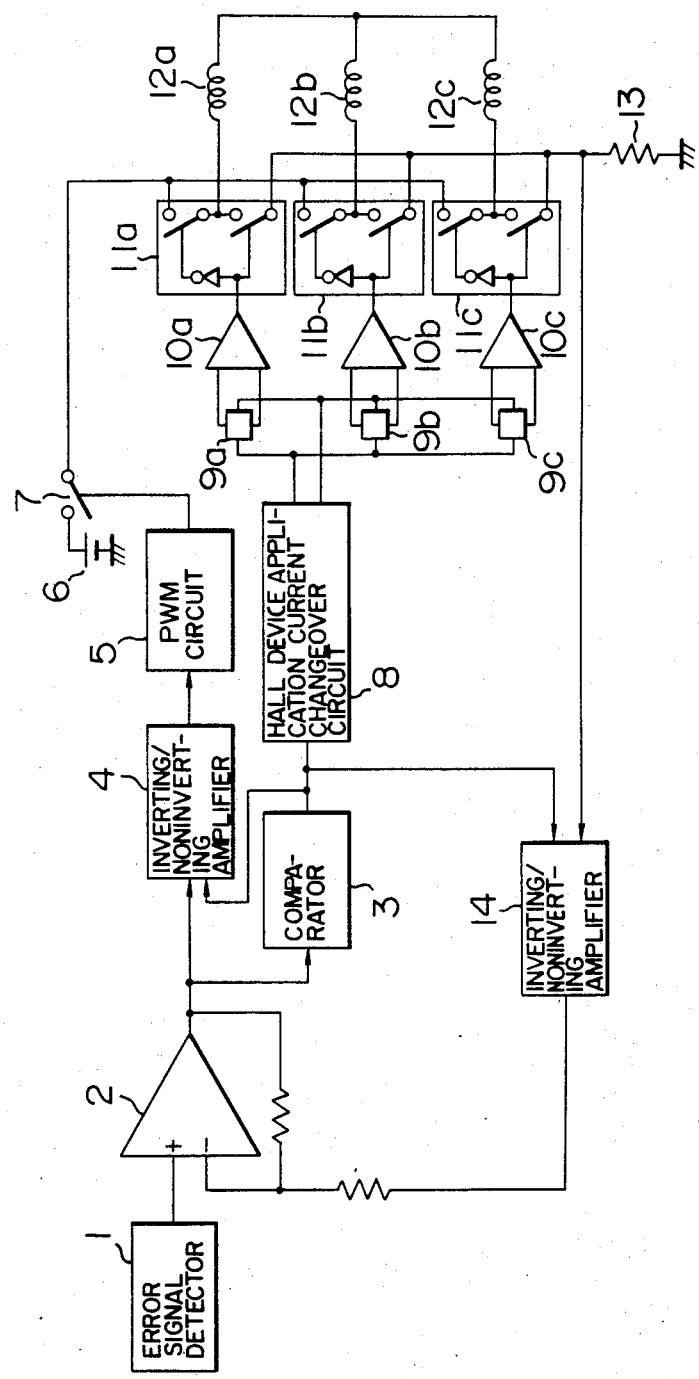
FIG. 1 is a block diagram of an embodiment according to the present invention.

An embodiment of a three-phase brushless motor according to the presetn invention will now be described by referring to the block diagram illustrated in FIG. 1.

Figure 2:
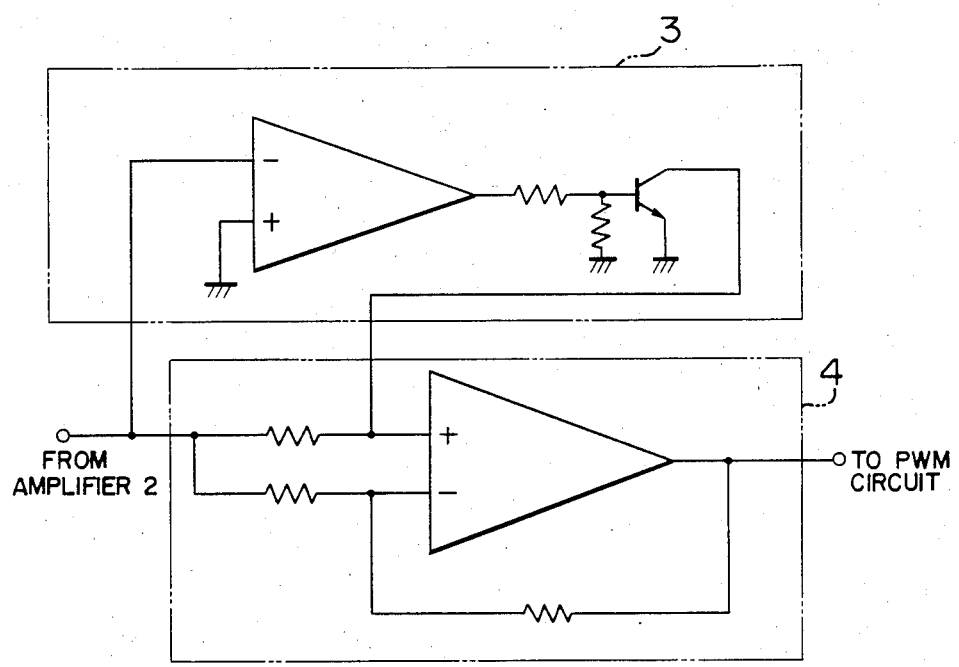
FIG. 2 is a circuit diagram for illustrating an example of a comparator and that of an inverting-noninverting amplifier shown in FIG. 1.

Reference numeral 1 denotes an error signal detector for speed or phase. In a video disk player, for example, the reproduced HD (Horizontal Deflection) signal is compared with the reference HD (Horizontal Deflection) signal and detected to produce a speed/phase error signal. An amplifier 2 is provided for the purpose of current feedback. The error signal is supplied to the noninverting input of the amplifier 2 and the current feedback signal is supplied to the inverting input of the amplifier 2. A comparator 3 compares the output of the amplifier 2 with the zero potential to produce the logic level "L" when the output of the amplifier 2 is positive and the logic level "H" when the output of the amplifier 2 is negative. As illustrated in FIG. 2, an amplifier 4 amplifies the output of the amplifier 2 in either inverting mode or in the noninverting mode according to the output of the comparator 3. The amplifier 4 serves as a noninverting amplifier when the output of the comparator assumes the logic level "L" and serves as an inverting amplifier when the output of the comparator assumes the logic level "H". Therefore, the output of the amplifier 4 always becomes positive or zero. A PWM circuit 5 pulse width modulates to the output of the amplifier 4. The pulse width modulated signal which is output from the PWM circuit 5 opens or closes a switch 7 to chop the current flowing from the power supply 6 to the motor. On the basis of the output of the comparator 3, a Hall device application current changeover circuit 8 changes over the direction of the current applied to the Hall device. For example, the direction of the current is so changed that a torque generates which accelerates the rotation of the motor when the output of the comparator 3 assumes the logic level "L" and a torque generates which decelerates the rotation of the motor when the comparator 3 assumes the logic level "H". Each of Hall devices 9a to 9c for detecting the rotational position defines the direction of the current flowing through the stator coil. The current of Hall devices 9a, 9b and 9c is shifted in phase by 120° with respect to 9b, 9c and 9a, respectively. Each of the Hall devices 9a to 9c generates a voltage dependent upon the polarity of the current supplied from the changeover circuit 8 and the rotary field. The voltage thus generated controls an associated one of switch pairs 11a to 11c through an associated one of amplifiers 10a to 10c. Each of switch pairs 11a to 11c is composed of two switches which assume on/off states opposing each other and is placed in the current path of an associated one of the stator coils 12a to 12c.

When the upper switch of the switch pair 11a is closed, the output chopped by the switch 7 flows through the stator coil 12a. At this time, the lower switch of either one of the remaining switches 11b and 11c is in the closed state. A current flows through the switch pair having the lower switch closed and the stator coil connected thereto into a resistor 13.

Each of these switch pairs can be realized by a PNP transistor and an NPN transistor, for example. The base of the PNP transistor is connected to that of the NPN transistor to form the input. The emitter of the PNP transistor is connected to that of the NPN transistor to form the output. The collector of the PNP transistor is connected to the side of the resistor 13. The collector of the NPN transistor is connected to the side of the switch 7. Although the stator coils 12a to 12c are coupled in the Y connection, they may be coupled in the delta connection. The resistor 13 converts the current flowing through each of stator coils 12a to 12c into a voltage value. An amplifier 14 serves as an inverting amplifier or a noninverting amplifier according to the output of the comparator 3. The amplifier 14 amplifies the voltage developed across the resistor 13 and has the same circuit configuration as that of the amplifier 4. The voltage at the resistor 13 is always positive with reference to 0 volt. When the output of the comparator 3 assumes the logic level "L", the amplifier 14 for amplifying the voltage across the resistor 13 produces an output of negative polarity since the amplifier 14 serves as an inverting amplifier. That is to say, the amplifier 14 produces a positive output when the output of the comparator 3 assumes the logic level "L" and produces a negative output when the output of the comparator 3 assumes the logic level "H". As described before, the output of the amplifier 14 is supplied to the amplifier 2 as the negative feedback input. Thus, the negative feedback signal has a polarity dependent upon the direction of the torque. As a result, the current flowing through the stator winding of the motor during the deceleration control is so controlled as to be equal to that during the acceleration control.

Since according to the present invention the negative feedback to the speed error signal is conducted in the form of the winding current of the motor, chopping dependent upon the current flowing through the motor winding is carried out for the current control. Since the motor torque is in proportion to the winding current, the influence of the speed electromotive force is eliminated. As a result, linear torque control with respect to the speed error signal becomes possible.

I claim:

1. A driver circuit for a motor having stator coils comprising:

error detector means for detecting the rotation phase of the motor and generating an error signal;

amplifier means for amplifying said error signal;

control signal generator means for generating an interrupted control signal on the basis of the amplified error signal of said amplifier means;

switch means for supplying an interrupted current to said stator coils in response to the control signal and having a polarity corresponding to the polarity of said error signal;

current detector means for generating a detected voltage dependent upon the magnitude of the interrupted current supplied to said stator coils, said current detector means being placed in the path of the interrupted current supplied said stator coils; and negative feedback means for negatively feeding back the detected voltage with a polarity dependent upon the polarity of said error signal to said amplifier means.

2. A driver circuit according to claim 1, wherein said switch means includes polarity determining means connected to the output of said amplifier means, said polarity determining means generating a determination signal when said error signal has a polarity indicating a phase delay, and wherein said negative feedback means includes inverting means for inverting the polarity of the detected voltage when said determination signal is supplied thereto.

3. A motor driver circuit comprising:

a speed error detector for detecting the speed error of a motor;

a speed error signal amplifier for amplifying the output signal of said speed error detector;

a comparator for determining the polarity of the speed error signal;

an inverting/noninverting amplifier for amplifying the output signal of said speed error signal amplifier, said inverting/noninverting amplifier being switched into the inverting mode or noninverting mode on the basis of the signal supplied from said comparator;

signal generating means for generating a chopping signal on the basis of the output signal of said inverting/noninverting amplifier;

a switching element for controlling the current flowing from the power supply to a motor stator on the basis of the output signal of said signal generating means;

a current changeover circuit for changing over the current flowing into the motor stator on the basis of the output signal of said comparator;

means for supplying power to the stator on the basis of the output of said current changeover circuit;

means for detecting the value of a current flowing through the motor stator; and an inverting/noninverting amplifier for amplifying said current value in the inverting mode or noninverting mode depending upon the polarity of said speed error signal, a negative feedback signal being applied to said speed error signal amplifier in the form of said current value to control the current flowing through stator coils in response to said speed error signal.

* * * * *